United States Patent Office 2,736,659
Patented Feb. 28, 1956

2,736,659

METHOD FOR PREPARATION OF HIGHLY REFRACTIVE MATERIAL

Langtry E. Lynd, South Plainfield, N. J., and Leon Merker, Bronx, N. Y., assignors to National Lead Company, New York, N. Y., a corporation of New Jersey No Drawing. Application July 23, 1954,
Serial No. 445,462

3 Claims. (Cl. 106—42)

This invention relates to monocrystalline barium titanate and to methods of making and treating monocrystalline barium titanate.

Many types of materials have been produced as sintered bodies which possess relatively high refractive indices. Among these sintered bodies are barium titanate. Such bodies are prepared in various ways by sintering powdered barium titanate material. Various advantages could be obtained if barium titanate could be prepared as monocrystalline material instead of in the well-known sintered form. Various techniques have been employed to produce monocrystalline barium titanate but none has been produced prior to our investigations except in extremely small sizes. For many actual uses such small single crystals cannot be employed and therefore the sintered titanate bodies have been used instead. During our investigations on production of single crystals, we have attempted to produce many types of single crystals and among those is the monocrystalline barium titanate contemplated by the instant invention.

Many attempts have been made in the past to prepare usable size single crystals of barium titanate but all have failed. Barium titanate crystallizes in both the hexagonal and tetragonal forms. It is desirable to produce large single crystals of barium titanate in both crystal forms and particularly in the tetragonal form because of the unusual electrical characteristics which this type of crystal possesses. The preparation of barium titanate compositions in the tetragonal form is more fully disclosed and claimed in copending application Serial No. 408,835 filed by us February 8, 1954, now U. S. Patent No. 2,723,916.

An object of this invention, however, is to produce single barium titanate crystals of commercially usable size which possess the hexagonal form. Another object of this invention is to provide a process for producing such crystals. Still another object is to provide a simple and economical method for producing such barium titanate single crystals which have a high index of refraction and are useful for optical objects, such as, lenses, prisms and the like. These and other objects will become more apparent from the following more complete description of the instant invention.

Broadly this invention contemplates monocrystalline hexagonal barium titanate. It further contemplates the preparation of such monocrystalline hexagonal barium titanate which comprises forming an intimate mixture of finely divided barium titanate and a small amount of oxidic compound of barium, fusing said mixture to form a monocrystalline mass in the form of a boule. The finely divided mixture may be fused in an oxyhydrogen flame. This invention also contemplates subsequently subjecting the boule to an oxidizing treatment at elevated temperatures but not exceeding about 800° C.

It has been found that the addition of an oxidic compound of barium to the barium titanate feed material provides a mixture from which a hexagonal barium titanate boule is easily grown. It has been found that barium titanate feed material containing as low as about 0.1% excess barium oxide is effective in aiding the formation of monocrystalline barium titanate. Amounts as high as 20% excess barium oxide have been successfully employed, and higher amounts may be used, but the preferred range, however, lies between about 1.0% and about 10%. Employing amounts greater than about 10% may be used, but the results are not superior to those obtained by employing amounts which fall within the preferred range. Only a very small amount of the excess barium oxide remains in the boule formed. Most of the barium oxide volatilizes in the flame and is lost from the boule itself.

The term barium titanate is intended to embrace both pure and substantially pure $BaTiO_3$, the latter which contains impurities or coloring or modifying agents either present or added which are of a nature and in amount so as not to adversely affect the monocrystalline structure nor alter the desired properties of the barium titanate material produced. In most cases the impurities are held to a minimum and ordinarily will not exceed a few tenths of a per cent and modifying or coloring agents are added in the amount necessary to produce the desired effect.

In order to prepare a monocrystalline mass by cofusing particles of barium titanate, it is necessary to employ high temperatures. Barium titanate melts in the neighborhood of 1600° C. and it is therefore preferred to use an oxygen-hydrogen flame in order to obtain the necessary temperatures without the possible introduction of impurities.

In order to fuse the powdered mixture to form a boule it has been found that the temperature of the flame should be maintained somewhat above the melting point of the titanate feed material, but should not exceed a temperature where the molten material tends to flow over the edges of the pool at the top of the boule. The flame temperature may be maintained by adjusting the quantity and rates of flow of both the hydrogen and oxygen gases but it is important that the flame be kept as constant and quiet as possible. The temperature should be held between about 1600° C. and 1725° C. preferably between about 1625° C. and 1700° C.

It is convenient to drop the finely divided particles of the barium titanate composition into the area of intense heat formed by the oxygen-hydrogen flame, i. e. in or near the oxygen cone. Within this area the barium titanate composition melts and as it cools below the melting point crystallizes as a single crystal on a base which holds the molten barium titanate material. In order to start such a single crystal to form it is desirable to first form a seed and then gradually build up the amount of molten material on the seed to form the crystal. Such a procedure allows the crystal to build up upon itself, gradually increasing in diameter until a boule or carrot-shaped single crystal of barium titanate is formed. The size of the orifices of the oxygen-hydrogen torch determines the size of the intensely heated zone which in turn determines the diameter of the carrot-shaped crystal produced.

It is preferred to employ a barium titanate powdered material which is substantially free from objectionable or incompatible impurities which detrimentally would affect the crystal structure and which has the chemical composition $BaO \cdot TiO_2$, i. e. approximately one mol of BaO for each mol of $TiO_2$. The starting material should be finely divided and fairly uniform in size. Such a material may be conveniently prepared by first reacting titanium oxalate with barium chloride to precipitate barium titanium oxalate. After thoroughly washing the barium titanium oxalate, it is heated at a temperature of at least 500° C. to remove the oxalate portion, thus forming barium titanate. Preferably this barium titanate material is then crushed and ground to obtain finely divided material from which the barium titanate single crystal is subsequently formed.

Substantially any oxidic compound of barium can be added to the feed material, for example, the oxide or any oxidic compounds which form the oxide at the temperatures employed in the preparation of the barium titanate boule. According to the present invention a small amount of an oxidic compound of barium, for example, the oxide may be mixed with the barium titanate starting material in any convenient maner, for instance, by dry mixing. A more uniform mixture and therefore a preferred mixture may be prepared by adding compounds of the addition agent as a powder, slurry, or solution, to the barium titanium oxalate prior to the heat treatment to remove the oxalate portion.

When employing quantities of barium oxide in the feed material according to the instant invention, the boule is easily formed, and it can be rapidly grown. If it is attempted to form a boule without the addition of the excess barium oxide it has been found that multicrystalline mass of both the tetragonal and hexagonal phases will form due to inversions which take place during the cooling cycle.

A series of boules were prepared in the following manner. The feed materials consisted of a mixture of barium titanate and various quantities of barium oxide within the specified range. These feed materials were progressively fused by passing the powdered material through the flame. The fusions were carried out at temperatures between 1625° C. and 1700° C. The boules were grown on a pedestal as the fused material was progressively crystallized. As produced, the boules were substantially black in color. They were substantially carrot-shaped and had a more or less frosted outer surface. When split, the interior surface of the pieces is vitreous and shiny. These boules were subsequently subjected to an oxidizing treatment, in either whole or split form at temperatures from 650° C. to 800° C. for 12 to 180 hours. These oxidized crystals were then cut and polished to form various objects such as optical lenses, prisms, and the like.

By the method described above, a monocrystalline glass-like composition which possesses an index of refraction of 2.2 with a high dispersion has been prepared. Such material is suitable for the manufacture of optical objects. By use of the instant invention a rapid process for the manufacture of monocrystalline composition is provided which is economical and easy to operate.

While this invention has been described and illustrated by the examples shown, it is not intended to be limited thereto, and other modifications may be employed within the scope of the following claims.

We claim:
1. Method for the preparation of a hexagonal monocrystalline mass of barium titanate which comprises periodically introducing into an oxygen-hydrogen flame a powdered composition consisting essentially of barium titanate and from about 0.1% to about 20% by weight of an oxidic compound of barium and crystallizing the melted material as a monocrystalline mass in the form of a boule.

2. Method for the preparation of a hexagonal monocrystalline mass of barium titanate which comprises periodically introducing into an oxygen-hydrogen flame a powdered composition consisting essentially of barium titanate and from about 0.1% to about 20% by weight of barium oxide, crystallizing the melted material as a monocrystalline mass in the form of a boule and subsequently subjecting the boule to an oxidizing atmosphere at elevated temperature up to about 800° C.

3. Method for the preparation of a monocrystalline mass of barium titanate which comprises periodically introducing into an oxygen-hydrogen flame a powdered composition consisting essentially of barium titanate and from about 1.0% to about 10.0% by weight of an oxidic compound of barium and crystallizing the melted material as a monocrystalline mass in the form of a boule.

No references cited.